INVENTOR
GEORGE E. ROWE

BY McCormick,
Paulding & Huber
ATTORNEYS

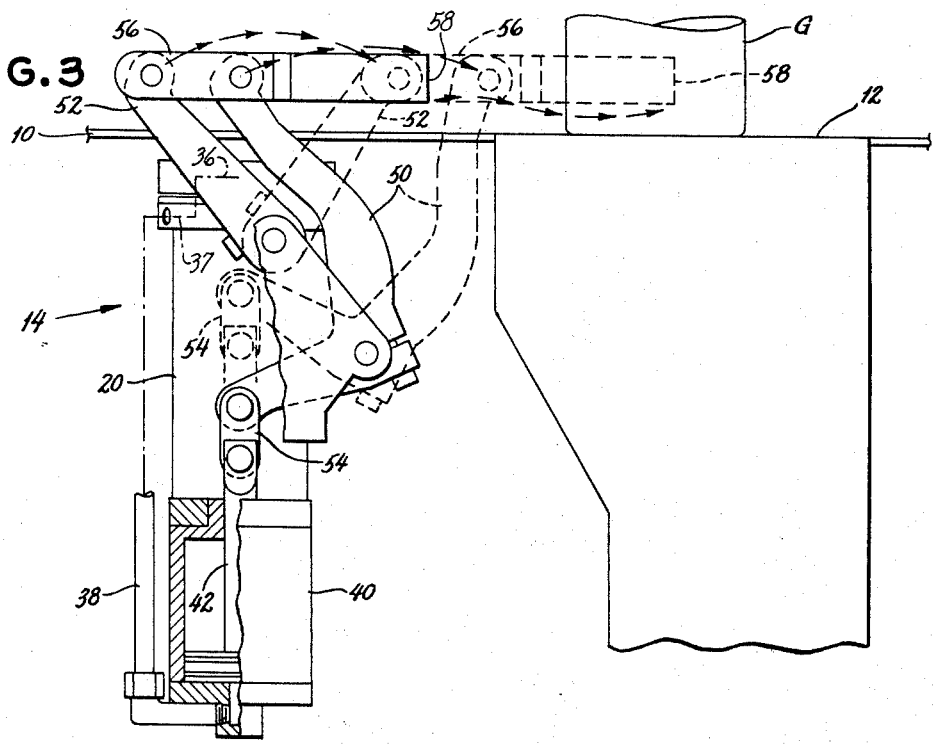
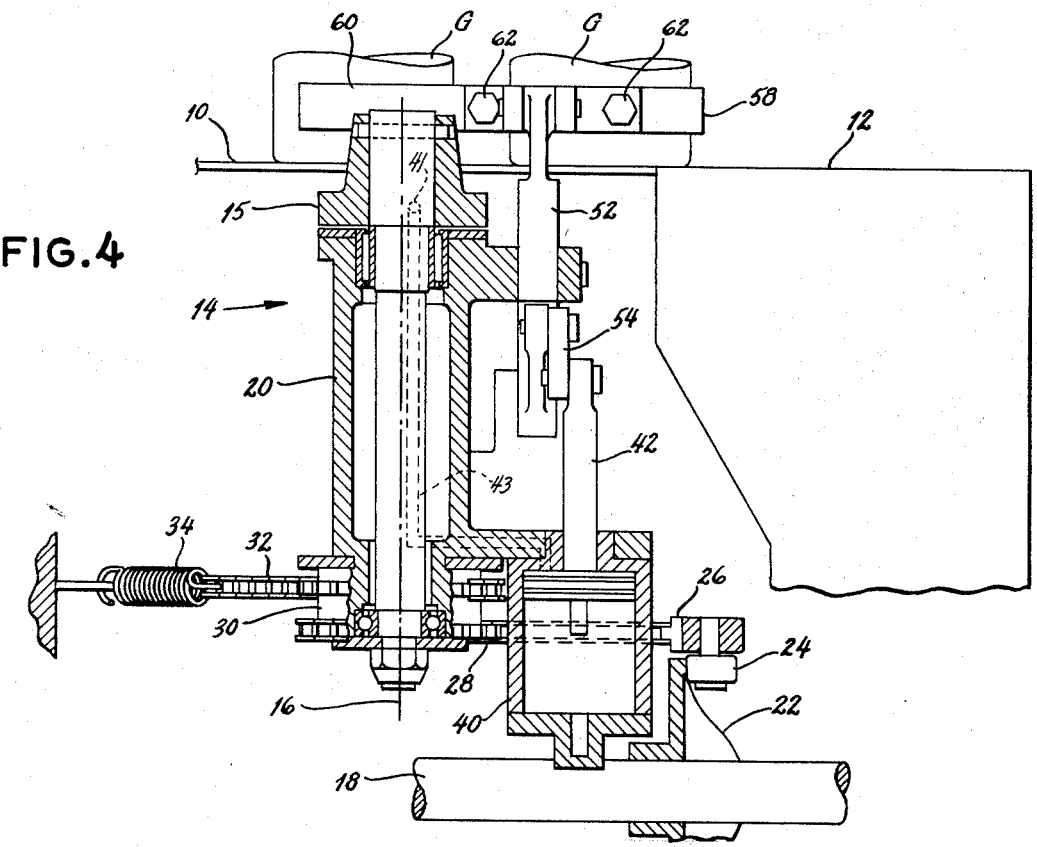

United States Patent Office 3,400,802
Patented Sept. 10, 1968

3,400,802
APPARATUS FOR MOVING NEWLY FORMED GLASSWARE ARTICLES ONTO A CONTINUOUSLY MOVING CONVEYOR
George E. Rowe, Wethersfield, Conn., assignor to Emhart Corporation, Bloomfield, Conn., a corporation of Connecticut
Filed Dec. 29, 1966, Ser. No. 605,924
4 Claims. (Cl. 198—20)

ABSTRACT OF THE DISCLOSURE

A fluid motor is mounted on a base so that both move horizontally through 90 degrees. The motor has a vertically reciprocable portion connected to the longer of two levers, which levers carry glassware engaging means for sweeping the ware from a deadplate onto an adjacent conveyor. As a result of the lengths of the two levers the cantilevered portion of the means for so sweeping the ware drops downwardly toward the ware during retraction of the fluid motor to minimize the likelihood of toppling the ware being taken away by the conveyor.

---

This invention relates to apparatus for handling newly formed articles of glassware or the like, and deals more particularly with an apparatus for moving such articles through an arcuate path from a deadplate onto an adjacent conveyor.

It is the general object of the present invention to provide an apparatus capable of operating in timed relationship with a glassware forming machine, which apparatus occupies less space alongside the deadplate than prior art devices, and which apparatus also operates in an improved manner with less tendency to topple the glassware articles during high-speed operation.

Glassware forming machines, such as the well-known Hartford I.S. machine often comprise a plurality of sections operated by common drive means and in timed relationship with each other so that one or more articles of glassware are placed by each section on a deadplate in timed sequence and in timed relationship with similar operations in the other machine sections. Patent No. 3,249,200 entitled "Apparatus for Moving Newly Formed Glassware Onto a Conveyor" discloses one mechanism for depositing glassware articles on a continuously moving adjacent conveyor. The present invention represents an improvement over the construction shown in that patent.

The drawings show a preferred embodiment of the invention and such embodiment will be described, but it will be understood that various changes may be made from the construction disclosed, and that the drawings and description are not to be construed as defining or limiting the scope of the invention, the claims forming a part of this specification being relied upon for that purpose.

Of the drawings:

FIG. 3 is a vertical sectional view taken along the line 3—3 of FIG. 1.

FIG. 4 is a vertical sectional view taken along the line 4—4 of FIG. 2.

Figure 1:
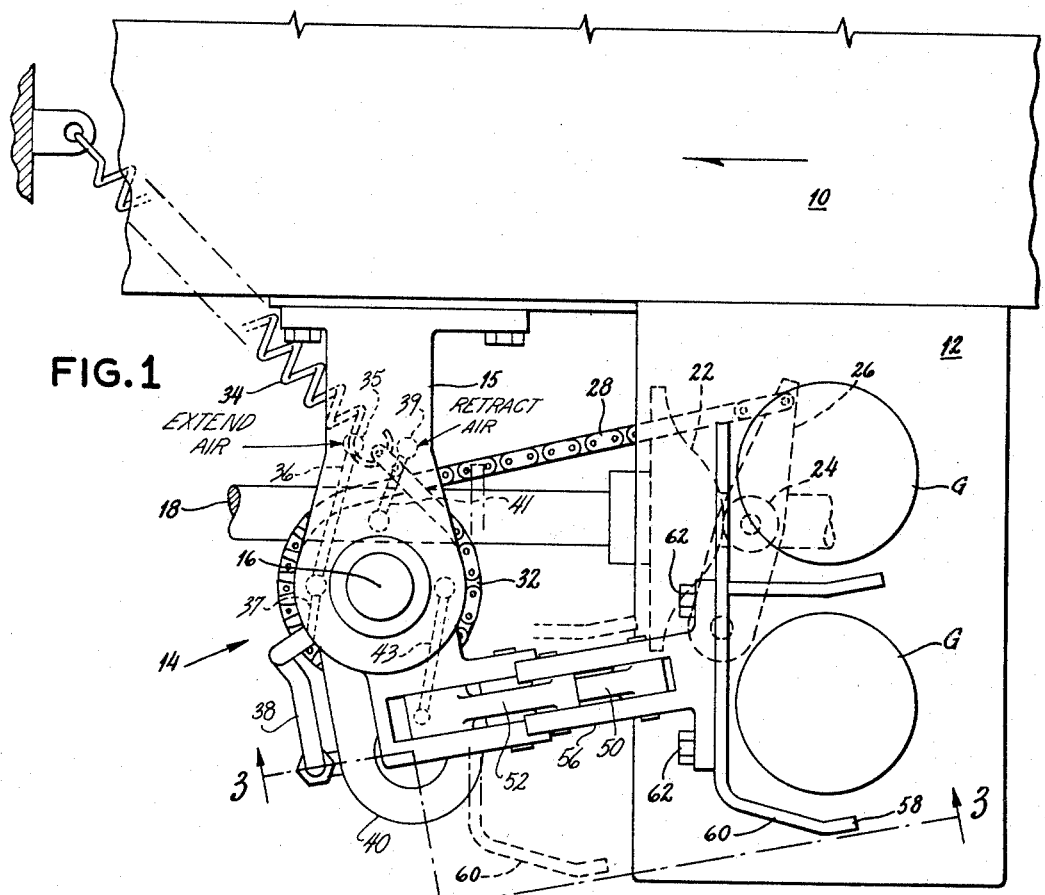
FIG. 1 is a plan view of an apparatus consrtucted in accordance with the present invention, showing the article engaging means in both its extended and its retracted position relative to the deadplate, the retracted position being shown in broken lines.
Figure 2:
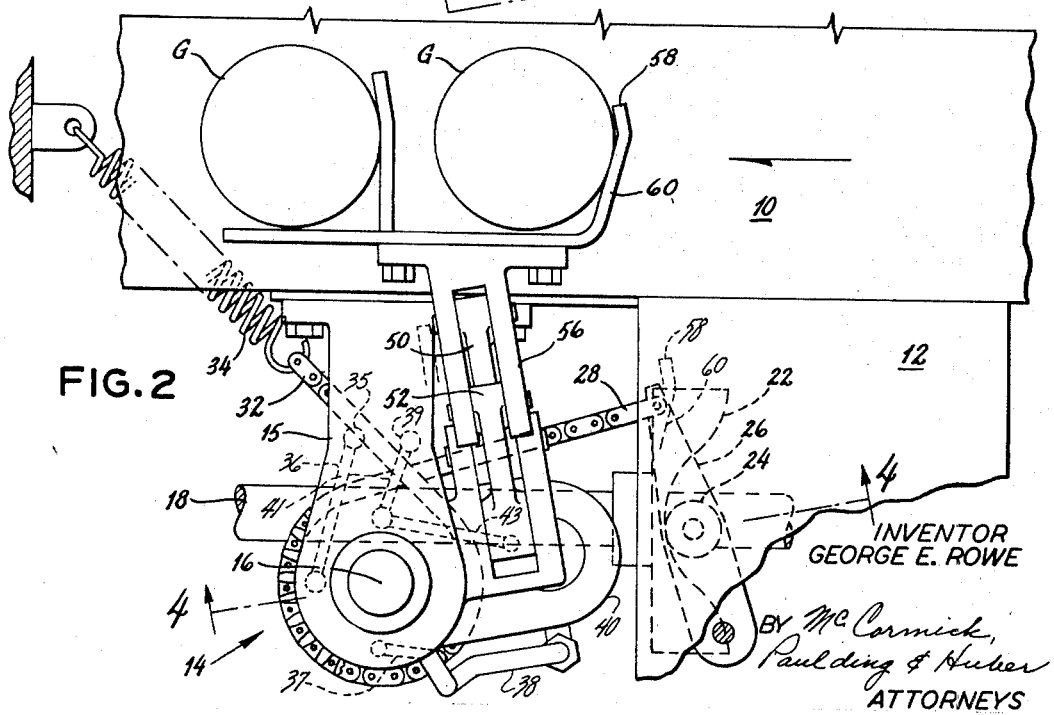
FIG. 2 is a view similar to FIG. 1 but showing a portion of said apparatus in a pivoted position wherein it faces the adjacent longitudinal edge of the conveyor.

Turning now to the drawings in greater detail, a continuously moving conveyor is shown at 10, and one associated deadplate 12 is arranged in a conventional fashion along side the conveyor as shown. A base 14 is rotatably supported in a bracket 15 adjacent one side edge of the conveyor 10 for oscillation about a substantially vertical axis 16 and through a substantial angle as indicated in FIGS. 1 and 2. More particularly, the base 14 is oscillatable through substantially a 90 degree angle between a first position facing the deadplate 12 as shown in FIG. 1, and a second position facing the conveyor 10 as shown in FIG. 2.

Suitable drive means is provided for so oscillating the base 14, and as best shown in FIG. 4 said drive means comprises a longitudinally extending cam shaft 18 which is driven by the glassware forming machine in a suitable manner as for example by a sprocket and chain connection from the drive shaft of the glassware forming machine (not shown). A cam 22 rotates with the cam shaft 18 and has a suitable slope for engaging a cam follower 24. The cam follower 24 is rotatably carried on a lever arm 26, which arm 26 is pivotally supported beneath the deadplate for rotation about a fixed vertical axis as best shown in FIGS. 1 and 2. As there shown, the cam follower 24 is located intermediate the ends of the lever arm 26, one end being pivoted as aforesaid and the opposite end carrying a chain 28 which is entrained on a sprocket 30 on the lower end of the base 14 as best shown in FIG. 4. The sprocket 30 is adapted to carry two such chains as shown, the upper chain 32 being connected to a fixed portion of the apparatus through a spring 34, as best shown in FIGS 1 and 2. As so constructed, rotation of the cam shaft 18 causes oscillation of the base 14, through substantially a 90 degree angle, and in timed relation with the operation of the glassware forming machine. That is, the cam operated lever arm 26, being connected with the chain 28, oscillates the said base, while the spring 34, being connected with the chain 32, opposes the lever arm and maintains cam and follower engagement.

As the base oscillates, it carries with it a vertically reciprocable fluid motor 40 having an upwardly extensible and downwardly retractable piston rod 42. Air is supplied to the lower end of the motor 40 for extending the piston rod 42 and to the upper end for retracting it. The air for extending the rod is introduced to the assembly through an inlet 35 in the bottom of the bracket 15 (FIGS. 1 and 2), then it flows through a passage 36 in the bracket which directs the air downwardly onto the top of the oscillatable base 14. When the said base is rotated to face the deadplate 12, passage 37 in the base, and opening into the top thereof, communicates with the bracket passage 36, and this base passage 37 is connected with external piping 38 extending to the bottom of the motor 40. Thus, whenever the base faces the deadplate, the fluid motor piston rod 42 is automatically extended upwardly. Then, when the base is rotated away from the deadplate, the air is vented from the bottom of the motor through the top opening of the base passage 37 which is no longer in communication with the bracket passage 36.

Air is supplied to the top end of the motor 40 for retracting the piston rod 42 through an inlet 39 in the bottom of the bracket 15, and then it flows through a bracket passage 41 which opens onto the top of the oscillatable base 14. When the said base is rotated to face the conveyor 10, a passage 43 therein which extends from the top of the motor to the top of the base communicates with the bracket passage 41. Thus, whenever the base 14 faces the conveyor 10, the fluid motor piston rod 42 is automatically retracted downwardly. Then, when the base is rotated away from the conveyor, the air is vented from the top of the motor 40 through the top opening of the base passage 43 which is no longer in communication with the bracket passage 41.

In further accord with the present invention, article engaging means 60 is provided above the level of the conveyor 10 and the deadplate 12 for sweeping and carrying the articles G, G from their position over the deadplate to positions over the conveyor as the base is moved from its first to its second position. Suitable linkage means is provided between said article engaging means 60 and the reciprocable motor portion or rod 42 for movement of the respective article engaging means 60 between the respective positions shown in FIG. 1. More particularly, extension of the reciprocable motor piston 42 is operable to extend the article engaging means 60 across and above the deadplate as shown in full lines in FIG. 1, and across and above the conveyor as shown in FIG. 2. Retraction of the piston 42 retracts the means 60 as shown in broken lines. Automatic extension and retraction of the reciprocable portion 42 is obtained by introducing air under pressure selectively through one of the above described pressure lines while venting the other thereof.

The linkage means connecting the reciprocable motor portion 42 to said article engaging means 60 more particularly comprises first and second levers 50 and 52 each of which is pivotally connected to the rotatable portion 20 of the base at one end and to the article engaging means at its upper end.

Each of the levers 50 and 52 is generally vertically disposed, and as best shown in FIG. 4 one is preferably arranged substantially above the other so that the entire apparatus occupies a minimum of floor space between the deadplate 12 and the conveyor 10. One of the levers, as shown the first lever 50, is connected to the upper end of the reciprocable motor portion 42 through a connecting link 54. As so constructed the connecting link 54 serves to rotate the lever 50 between the solid and the broken line positions shown in FIG. 3 in response to movement of the reciprocable piston 42. The upper or free end portions of each of the levers 50 and 52 is pivotally connected to an elongated stem portion 56 of the article engaging means 60 and is so arranged as to define a three bar linkage therewith. As viewed in FIG. 3, the stem portion 56 of the article engaging means 60 comprises the third bar of said linkage and a projecting end 58 thereof will be seen to follow an arcuate movement characterized by a dipping motion as indicated by the arrows of that figure. This dipping motion is due to the fact that the lever 52 is somewhat shorter than the lever 50. More particularly, the path of movement of the right-hand end 58 of the stem portion 56, and hence of the article engaging means 60 which is carried thereby is initially downwardly toward the deadplate 12, and then upwardly away from said deadplate to the position shown in broken lines. Conversely, upon retracting from the position shown in FIG. 2, the article engaging means 60 moves initially downwardly toward the conveyor 10 so as to substantially reduce the likelihood of toppling the articles on the conveyor. It is also noted that as the article engaging means 60 retracts, it follows an angled path to provide added clearance between itself and the articles on the take-away conveyor.

Finally, and still with reference to the article engaging means 60, said means will be seen to define at least one corner for engaging an article G to be moved from off the deadplate onto an adjacent conveyor, and preferably the corner defining portion thereof comprises a removable portion secured to the stem portion 56 by the screws 62, 62. As so constructed the corner defining portion of the article engaging means can be readily replaced with other corner defining portions configured to receive articles of various size and/or number. It is noted in this respect that the corner defining portion shown in the drawing is configured to engage two articles G, G on a so-called double deadplate.

The invention claimed is:

1. Apparatus for moving glassware articles from a deadplate onto a continuously moving adjacent conveyor, and comprising in combination a base oscillatable on a substantially vertical axis through a substantial angle between a first position facing the deadplate and a second position facing the conveyor, drive means for oscillating said base between said first and second positions, a reciprocable motor mounted on said base and including a reciprocable portion which moves parallel to said vertical base axis, article engaging means defining at least one generally horizontally disposed corner for sweeping and carrying at least one article from its position over the deadplate to a position over the conveyor as said base is moved from its first to its second position, linkage means connecting said reciprocable motor portion to said article engaging means, motor control means for moving said reciprocable motor portion in timed relation with the oscillations of said base so that said article engaging means is moved toward articles on said deadplate when said base reaches its first position and is moved away from articles on said conveyor when said base reaches its second position, said linkage means including a first lever pivotally connected to said base for movement about a first lever axis fixed in said base, a second lever shorter than said first lever and pivotally connected to said base for movement about a second axis spaced vertically from said first axis, free end portions of both said levers pivotally connected to spaced points on said article engaging means, both said levers being disposed in the same vertical plane and having their upper end portions connected to spaced points on said article engaging means connecting means between said reciprocable motor portion and at least one of said levers for moving said article engaging means in response to movement of said reciprocable motor portion, said last-mentioned means including an outer corner defining portion which moves initially downwardly toward said conveyor as said means is moved away from said articles on said conveyor or to reduce the likelihood of toppling said articles.

2. Apparatus according to claim 1 wherein said connecting means comprises a link pivotally connected at one end to said reciprocable motor portion, and wherein one of said levers includes a crank arm which is pivotally connected to the opposite end of said link.

3. Apparatus according to claim 1 wherein said article engaging means includes a stem portion extending inwardly toward said base, said lever upper end portions being pivotally connected to spaced points thereon, and said corner defining portion of said article engaging means removably secured to said stem portion thereof so that said corner defining portion can be readily replaced with corner defining portions configured to receive articles of various size and number.

4. Apparatus according to claim 1 wherein said base and said reciprocable motor are located below the level of said conveyor and said deadplate, only said article engaging means and the free end portions of said levers extending above the level of said conveyor and deadplate.

References Cited

UNITED STATES PATENTS

| | | | |
|---|---|---|---|
| 3,249,201 | 5/1966 | Rydlewicz | 198—24 |
| 3,324,986 | 6/1967 | Dierksheide | 198—24 |

RICHARD E. AEGERTER, *Primary Examiner.*